United States Patent Office 3,038,940
Patented June 12, 1962

3,038,940
PROCESS FOR PREPARATION OF AROMATIC KETONES
Carl Serres, Jr., Whiting, Ind., and Ellis K. Fields, Chicago, Ill., assignors to Standard Oil Company, Chicago, Ill., a corporation of Indiana
No Drawing. Filed Apr. 25, 1958, Ser. No. 730,829
12 Claims. (Cl. 260—590)

This invention relates to a process for the preparation of aromatic ketones. More particularly it relates to a process for the selective catalytic oxidation of diarylmethanes in the liquid phase to produce diarylketones. In one aspect it concerns a process for the preparation of benzophenone by liquid phase oxidation of diphenylmethane with molecular oxygen.

In the past, diarylketones have been prepared by condensation reactions employing Friedel-Crafts type catalysts such as aluminum chloride, ferric chloride and the like. Typically, benzophenone is obtained by the alkylation of benzene with benzoyl chloride, by reaction of benzene with phosgene, or by hydrolysis of dichloro-diphenylmethane, which can in turn be prepared by Friedel-Crafts condensation of benzene with carbon tetrachloride. Generally such condensation reactions require large quantities of aluminum chloride catalyst to obtain desirably high yields of diarylketones and hence are uneconomical and commercially unattractive.

It is further known to convert diarylmethanes such as diphenylmethane to diarylketones by treatment with a variety of chemical oxidizing agents. For example, benzophenone has been prepared by nitric acid oxidation of diphenylmethane. Such oxidation procedures, however, are expensive, require the use of special corrosion resistant equipment and, as in the case of nitric acid, often lead to formation of undesirable by-products which are difficult to separate from the desired product, such as nitro-substituted compounds which result from interaction of the oxidizing agent with the aromatic nucleus at elevated temperatures.

Most desirably, the oxidation of organic compounds is achieved by the direct reaction of molecular oxygen, e.g. air, with the compound to be treated. Efforts have been made to oxidize diarylmethanes directly by means of molecular oxygen, but have led, for example as reported by Larsen in Industrial & Engineering Chemistry, vol. 34, p. 183 (1942), to the production of benzaldehyde as the principal oxidation product. Since it appears from this reference that oxidation of diphenylmethane in the liquid phase with oxygen gas in the absence of a catalyst leads to cleavage of the methylene to aromatic nucleus bond, it would be expected that more stringent oxidation conditions, for example, oxidation in the presence of a heavy metal oxidation catalyst, would likewise result in similar cleavage of the molecule.

Recently there has been disclosed a novel process for the catalytic oxidation by means of molecular oxygen of aromatic organic compounds containing at least one and preferably a plurality of aliphatic substituents to produce carboxy aromatic acids. This process, which employs a catalyst comprising in conjoint presence bromine and a heavy metal oxidation catalyst has been found to be extremely effective in oxidizing such compounds as ditolylethane to give a phthalic acid, e.g. terephthalic acid as the product of oxidation.

We have now discovered that aromatic ketones are conveniently and economically prepared in high yield by the liquid phase oxidation of aromatic compounds having at least one diaryl substituted methylene group with molecular oxygen in the presence of a catalyst comprising in conjoint presence bromine and a heavy metal oxidation catalyst. This discovery is all the more surprising in view of the known tendency of diarylmethanes such as diphenylmethane to yield benzaldehyde as the product of liquid phase non-catalytic oxidation, and the known ability of the catalyst system employed in the present invention to promote the simultaneous cleavage and oxidation of compounds such as ditolylethane to aromatic acids.

Accordingly, it is an object of the present invention to provide a process for effecting the oxidation of aromatic compounds having at least one diaryl substituted methylene group to aromatic ketones. Another object is to provide a catalytic liquid phase oxidation system for converting diarylmethanes to diarylketones. A more specific object is to provide a liquid phase catalytic process for the conversion of diphenylmethane to benzophenone in high yield and high conversions. An important object is to provide an efficient and relatively cheap process for producing benzophenone. Other objects and advantages of the present invention will become apparent from the following description.

In one aspect, the present invention provides a process for the preparation of diarylketones by oxidation of diarylmethanes in the liquid phase in the presence of a catalyst comprising in conjoint presence bromine and a heavy metal oxidation catalyst.

Diarylmethanes which are employed as feedstocks to the present process comprise compounds of the general formula R—$CH_2$—R' where R and R' are the same or different aryl groups including, for example, phenyl, naphthyl, biphenyl, phenanthryl, anthranyl and the like; such groups substituted by oxidation resistant or inert substituents such as halogen, nitro, sulfonic acid groups and the like; or by alkyl groups known to be highly resistant to oxidation, for example tertiary alkyl groups having 4 or more carbon atoms wherein the tertiary alkyl group is attached to the aromatic nucleus at the site of the tertiary carbon atom. The preparation of the diarylmethane feedstocks employed in the process of the present invention is well known in the art and will not be described here, reference being made, for example, to the methods for preparation of diphenylmethane described in Organic Synthesis, vol. 1, page 95, John Wiley and Sons, Inc., New York.

The feedstocks of the present invention may be the simple diarylmethanes described above or may include, for example, diarylmethanes in which the aryl groups are joined by a covalent bond. For example the compound fluorene having the general formula

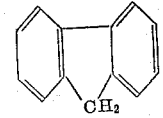

may be oxidized in accordance with the present invention to fluorenone, in which the methylene group is converted to a keto group. Similarly substituted fluorenes having oxidation resistant ring substituents such as halo, nitro, or tertiary alkyl groups are oxidizable to the corresponding substituted fluorenones.

Similarly, polyaryl compounds having more than one di-aryl substituted methylene group, e.g. polybenzyl or other polyaryl compound having the structural formula aryl-$CH_2$-(arylene-$CH_2$)$_n$aryl are oxidized to aromatic polyketones in accordance with the process of the present invention. Such compounds wherein n has a value from 1 to 10, especially 1 to 5, and wherein the aryl group is a benzene ring, are especially useful as feed stocks for the present invention.

In the practice of the invention, the oxidation of organic compounds whereby diarylketones are obtained may be effected by reacting such compounds with molecular oxygen, e.g. air, in the conjoint presence of bromine and a heavy metal oxidation catalyst. As the heavy metal oxidation catalyst there may be employed catalysts that have heretofore been employed for accelerating the oxidation of organic compounds, such as the polyvalent metals having atomic weights between about 50 and 200. Excellent results are obtained by utilization of a metal having an atomic number 23–28, including vanadium, chromium, manganese, iron, cobalt, and nickel. Particularly excellent results are obtained with a metal of the group consisting of manganese, cobalt and mixtures thereof.

It has been found that the catalytic amount of the metal may be either as a single metal or as a combination of such metals. The metal may be added in elemental, combined or ionic form and the bromine may similarly be added in elemental, combined or ionic form. As a source of bromine, ammonium bromide or other bromine compounds soluble in the reaction medium may be employed. Satisfactory results have been obtained for example, with potassium bromide, tetrabromoethane and benzyl bromide.

The metal may be supplied in the form of the free metal, as the oxide or hydroxide, or in the form of metal salts. For example, the metal manganese may be supplied as the manganese salt of a lower aliphatic carboxylic acid, such as manganese acetate, as the salt of a fatty acid, such as manganese oleate or linoleate, as the metal salt of an aromatic or alicyclic acid, such as manganese naphthenate, or in the form of an organic complex, of which mention may be made of the acetylacetonate, the 8-hydroxyquinolinate and the ethylene diamine tetraacetate, etc., as well as manganese salts such as the borates, halides, nitrates and the like which are also efficacious.

The reaction temperature should be sufficiently high so that the desired oxidation reaction occurs, and yet not so high as to cause undersirable charring or formation of tars. Thus temperatures in the range of about 120° to about 275° C., desirably 150° to 250° C. and preferably 170° to 225° C. may be employed. The reaction time should be sufficient to obtain a desirable conversion of the aromatic material to the desired ketone, e.g. in the range of about 0.5 to about 25 or more hours, preferably up to about 4 hours.

The oxygen used may be in the form of substantially 100% oxygen gas or in the form of gaseous mixtures containing lower concentrations of oxygen, such as, for example, air. The ratio of total oxygen fed into the reaction mixture relative to the aromatic compound oxidized is in the range of about 2 to 500 moles of oxygen per mole of substituted aromatic materials, desirably in the range of 5 to 300 and preferably in the range of 5 to 75.

The process of the present invention is conducted under essentially liquid phase conditions, desirably in the presence of an oxidation resistant reaction medium in which the organic reactant is soluble or suspended. The relation of temperature and pressure is so regulated as to provide a liquid phase in the reaction zone. Generally the pressure may be in the range of atmospheric to about 1500 p.s.i.g., the pressure being sufficient at the operating temperature to maintain all or a part of the organic reactant in the liquid phase.

As inert reaction media there may be employed materials substantially inert to oxidation which facilitate carrying out the desired reaction and recovering the desired product or products. Desirably this added medium is a monocarboxylic acid relatively stable or inert to oxidation in the reaction system, preferably containing about 2 to 8 carbon atoms in the molecule for example saturated aliphatic monocarboxylic acids, aromatic acids such as benzoic acid, alicyclic acids such as cyclohexane carboxylic acid and the like. Saturated aliphatic monocarboxylic acids containing 2 to 4 carbon atoms are particularly preferred. Mixtures of acids may be used, for example mixtures of said lower carboxylic acids, or mixtures of such acids with benzoic acid. Where all of the advantages of an acid medium are not required, other inert media may be used, of which mention may be made of benzene, carbon tetrachloride, chlorinated hydrocarbons such as chlorinated benzenes or chlorinated naphthalenes, and the like.

Where the lower aliphatic monocarboxylic acid medium is used, it is generally not necessary to use large amounts thereof. Such acids in the range of 0.1 to 10 parts by weight, desirably 0.5 to 4 and preferably 1 to 2.5 per part of aromatic material have been found adequate.

The catalyst, illustratively, may be a heavy metal bromide, for example, manganese bromide, and may be added as such or by means of materials which provide a catalytic amount of heavy metal and of bromine in the reaction system. The heavy metal oxidation catalyst may be added in the form of the metal, oxide, acetate or analogous carboxylate salts or as a heavy metal halide; and the bromine may, as above indicated, be added in the form of elemental bromine, ammonium bromide, hydrogen bromide or other bromine compound soluble or partially soluble in the system, e.g. potassium bromate. If desired, the bromine may be in the form of a soluble organic bromide, viz. tetrabromoethane, benzyl bromide and like. The amount of catalyst, for example of manganese and bromine, calculated as $MnBr_2$ may be in the range of about 0.1 to 10 percent by weight or more of the aromatic reactant charged, desirably 0.3 to 2 and preferably 0.5 to 1.7 percent. Mixtures of materials may be used, and the proportions of heavy metal oxidation catalyst and bromine may be varied from their stoichiometric proportions encountered in heavy metal bromides such as $MnBr_2$, for example in the range of about 1 to 10 atoms of heavy metal per atom of bromine to about 1 to 10 atoms of bromine per atom of heavy metal.

In order to facilitate a clear understanding of the invention, the following preferred specific embodiments are described in detail.

Example 1

In a tubular reactor fitted with a stirrer and heating means and provided with a water cooled condenser, gas inlet means and valved gas outlet for adjusting the exit flow of gas were charged 54 parts diphenylmethane, 150 parts glacial acetic acid and a solution of 1.2 parts of a mixture of cobalt acetate and manganese acetate (as the tetrahydrates) and 0.4 part ammonium bromide in 6 parts of water. The mixture was heated at 205° C. while air at 400 p.s.i.g. was passed through the mixture at a rate of 3.7 liters/minute, the reactor pressure being maintained throughout at 400 p.s.i.g. The oxygen in the vent gases dropped to 3.2%, then rose over 240 standard liters of air to 20.8%. The reactor was cooled, the contents removed, and the solvent evaporated on a steam bath. The residue was dissolved in ether, washed successively with dilute aqueous sodium hydroxide solution and water, and the ether removed by evaporation. The liquid residue, 46 parts, crystallized readily and had a melting point of 45–47° C. Recrystallization from alcohol gave pure white crystals of benzophenone, melting point 46°–47° C. The yield was 80 mole percent. Small amounts of benzoic acid were recovered from the basic wash solution.

When the above procedure was repeated using half the quantity of catalyst previously employed, considerable unconverted diphenylmethane was recovered and the yield of benzophenone was only 47%.

In the absence of ammonium bromide, the yield of benzophenone was only 15%.

Example 2

Following the procedure of Example 1, 25 g. of fluorene, 150 g. of glacial acetic acid and a solution of 1.2 g. of a mixture of cobalt acetate and manganese acetate (as the tetrahydrates) and 0.4 g. of ammonium bromide in 6 mole of water was treated with 155 standard liters of air at 205° C. and 400 p.s.i.g. The reactor was cooled, the contents removed and the solvent removed by evaporation on a steam bath. The crystalline greenish-yellow residue weighed 27 g. Analysis of this residue showed it to be 76% by weight 9-fluorenone, equivalent to a yield of 76 mole percent. The residue was further purified by dissolving in benzene, filtering to remove insoluble materials, and evaporation of the benzene from the filtrate. The crude product so obtained was recrystallized from a mixture of benzene and n-hexane to give yellow crystals of 9-fluorenone, melting point 80–83° C. (literature 84° C.).

In the absence of ammonium bromide, the above procedure gave only a 48% yield of crude 9-fluorenone.

Example 3

Following the procedure of Example 1, 20 g. of 4,4'-dibenzyldiphenylmethane, 150 g. glacial acetic acid, and a solution of 1.2 g. of cobalt acetate and manganese acetate (as the tetrahydrates) and 1.0 g. of ammonium bromide in 6 ml. of water was treated with 200 standard liters of air at 400 p.s.i.g. and 205° C. The reactor contents were removed, cooled and the solvent evaporated on a steam bath. The brown crystalline residue weighed 25 g. and melted at 222°–227° C. Crystallization of the crude product from a chloroform-n-hexane mixture gave white crystals of 4,4'-dibenzoylbenzophenone having a melting point of 226–228° C. (literature value 227.5° C.).

Example 4

Following the procedure of Example 1, 25 g. of 4,4'-di-tert.-butyldiphenylmethane was oxidized in 150 g. of glacial acetic acid with air at 205° C. and 400 p.s.i.g. in the presence of cobalt acetate, manganese acetate and ammonium bromide catalyst. The oxygen content of the exit gases fell to 13%, then rose over 200 standard liters of air to 20.8%. The solvent was evaporated from the reaction product on a steam bath, and the residue dissolved in an equal volume of hot 95% ethanol. On cooling, light tan crystals of 4,4'-di-tert.-butylbenzophenone separated, having a melting point of 137.0–139° C. (literature 134.0–135.5° C.). Additional amount of product was recovered from the ethanol filtrate. The total yield of product was 20.0 g. or 77% of theory.

In the absence of ammonium bromide, otherwise employing the same reaction charge and conditions, considerable hydrocarbon was recovered and the yield of 4,4'-di-t-butylbenzophenone was only 34%.

The process may be conducted in a batch, intermittent or continuous manner.

Desirable results are achieved with various modifications of the foregoing, such as the following. The pressure should be sufficient to maintain a liquid phase reaction system. Generally, the pressure is in the range of atmospheric to about 1500 p.s.i.g.

The carboxylic acid solvent may be a monocarboxylic acid having from 2 to 8 carbon atoms, relatively stable in the reaction system. From the stability viewpoint, a lower saturated aliphatic acid such as acetic is preferred; propionic acid, butyric acid, caproic acid and the like may be employed. Benzoic acid, or mixtures of benzoic acid with lower aliphatic acids may be used.

The reaction temperature, reactant concentration, catalyst and its concentration, reaction time and yield of product are interrelated.

The reaction time may be in the range of 0.5 to 24 or more hours, preferably about 0.5 to about 4 hours, sufficient to obtain substantial conversion to the desired oxidation product. Generally higher temperatures are reflected in shorter reaction times, as are more active catalysts. Too high temperatures or too severe conditions tend to give somewhat poorer quality product. The particular combination of reaction mixture composition and reaction conditions used should be selected with a view to obtaining the best output of desired quality product.

In view of the foregoing, variations and modifications of the invention will be apparent to one skilled in the art, and it is intended to include within the invention all such variations and modifications except as do not come within the scope of the appended claims.

We claim:

1. A process for the preparation of aromatic ketones which comprises reacting an aromatic compound having at least one diaryl-substituted methylene group, said compound having no oxidizable aliphatic substituents, with molecular oxygen in the liquid phase in a solvent comprising an oxidation resistant monocarboxylic acid having from 2 to 8 carbon atoms in the molecule and in the presence of a catalyst comprising in conjoint presence bromine and a heavy metal oxidation catalyst and recovering said aromatic ketone.

2. Process according to claim 1 wherein said aromatic compound is selected from the group consisting of diphenylmethane and fluorene.

3. Process according to claim 1 wherein the bromine is present in an amount between about 0.1 to about 10 atoms per atom of heavy metal oxidation catalyst.

4. A process for the preparation of a diarylketone which comprises reacting a diarylmethane, said diarylmethane having no oxidizable aliphatic substituents, with molecular oxygen in the liquid phase in a solvent comprising a lower saturated aliphatic monocarboxylic acid having from 2 to 8 carbon atoms in the molecule and in the presence of a catalyst comprising in conjoint presence bromine and a heavy metal oxidation catalyst, effecting said reaction at a temperature of from about 120° C. to about 275° C. and a pressure of from atmospheric to about 1500 p.s.i.g. and recovering a diarylketone as the reaction product.

5. A process according to claim 4 wherein acetic acid is employed as said solvent in an amount of from about 0.1 to about 10 parts by weight per part of diarylmethane.

6. A process according to claim 4 wherein said heavy metal catalyst comprises a mixture of manganese and cobalt.

7. The process of claim 4 wherein said diarylmethane is diphenylmethane and benzophenone is recovered as the product.

8. The process of claim 4 wherein said diarylmethane is ditertiarybutyldiphenylmethane and di-tertiarybutylbenzophenone is recovered as the product.

9. A process for the preparation of fluorenone which comprises reacting fluorene with molecular oxygen in the liquid phase in a solvent comprising a lower saturated aliphatic monocarboxylic acid having from 2 to 4 carbon atoms in the molecule and in the presence of a catalyst comprising bromine and a heavy metal oxidation catalyst selected from the group consisting of manganese, cobalt and mixtures thereof, effecting said reaction at a temperature of from about 120° C. to about 275° C. and at a pressure of from atmosphere to about 1500 p.s.i.g., and recovering fluorenone as the reaction product.

10. The process of claim 9 wherein acetic acid is employed as the solvent and the heavy metal catalyst comprises a mixture of manganese and cobalt.

11. A process for the preparation of 4,4'-dibenzoylbenzophenone which comprises reacting 4,4'-dibenzyldiphenylmethane with molecular oxygen in the liquid phase in a solvent comprising acetic acid and in the presence of a catalyst comprising bromine and a heavy metal oxidation catalyst selected from the group consisting of manganese, cobalt and mixtures thereof, effecting said reaction at a temperature of from about 120° C. to about 275° C. and at a pressure of from atmospheric to 1500 p.s.i.g. and recovering 4,4'-dibenzoylbenzophenone as the reaction product.

12. The process of claim 11 wherein the heavy metal catalyst comprises a mixture of manganese and cobalt.

References Cited in the file of this patent

UNITED STATES PATENTS

| | | |
|---|---|---|
| 2,643,269 | Augustine | June 23, 1953 |
| 2,659,746 | Morgan et al. | Nov. 17, 1953 |
| 2,833,816 | Saffer et al. | May 6, 1958 |
| 2,859,247 | Radzitzky et al. | Nov. 4, 1958 |
| 2,920,087 | Hay | Jan. 5, 1960 |